United States Patent [19]

Glascock, Jr. et al.

[11] 4,005,330
[45] Jan. 25, 1977

[54] ELECTRODELESS FLUORESCENT LAMP

[75] Inventors: Homer H. Glascock, Jr.; John M. Anderson, both of Scotia, N.Y.

[73] Assignee: General Electric Company, Schenectady, N.Y.

[22] Filed: Dec. 18, 1975

[21] Appl. No.: 642,056

Related U.S. Application Data

[63] Continuation-in-part of Ser. No. 542,375, Jan. 20, 1975, abandoned.

[52] U.S. Cl. ............................ 315/57; 313/491; 313/493; 315/248; 315/267; 315/276; 315/348
[51] Int. Cl.² ...................................... H05B 41/24
[58] Field of Search ............. 315/57, 70, 248, 267, 315/276, 348, DIG. 2, DIG. 5, DIG. 7; 313/485–493

[56] References Cited

UNITED STATES PATENTS

| 966,204 | 8/1910 | Hewitt | 315/248 |
| 2,030,957 | 2/1936 | Bethenod et al. | 315/248 |
| 2,118,452 | 5/1938 | LeBel | 315/248 |
| 3,500,118 | 3/1970 | Anderson | 315/57 |
| 3,521,120 | 7/1970 | Anderson | 315/57 |
| 3,551,742 | 12/1970 | Gruzdev et al. | 315/248 |
| 3,611,009 | 10/1971 | McNeil | 315/57 |

Primary Examiner—Siegfried H. Grimm
Attorney, Agent, or Firm—Jack E. Haken; Joseph T. Cohen; Jerome C. Squillaro

[57] ABSTRACT

An electrodeless fluorescent lamp adapted for economical substitution in place of an existing incandescent lamp comprises an ionizable medium contained within a phosphor coated globular envelope. A closed loop magnetic core transformer, contained within a reentrant cavity in the base of the envelope, induces a radio frequency electric field which ionizes the medium to stimulate production of visible light output from the phosphor. A tubular extension of the envelope traverses the cavity, linking the core with a column of ionizable medium, to form a "secondary winding" on the transformer. A base assembly, attached to the envelope, supports a lamp plug for receipt of input energy. A radio frequency power supply, contained within the base assembly, provides electric current to a primary winding on the core.

A method for producing lamps in accordance with the invention comprises preforming the reentrant cavity, threading the magnetic core and winding structure onto a tubular member; fusing that member to the cavity; and assembling the cavity structure to a phosphor coated, globular shell.

29 Claims, 6 Drawing Figures

ELECTRODELESS FLUORESCENT LAMP

CROSS REFERENCE, CONCURRENT APPLICATION, AND INCORPORATION BY REFERENCE

This is a continuation-in-part of U.S. patent application Ser. No. 542,375, filed Jan. 20, 1975 and now abandoned.

The present invention relates to concurrently filed U.S. patent applications Ser. No. 642,142, John M. Anderson; Ser. No. 642,143, John M. Anderson; and Ser. No. 642,148, John M. Anderson, all of said patent applications having been assigned to the assignee of this patent application. The principles of operation of induction ionized fluorescent lamps using ferrite core transformers are disclosed in U.S. Pat. Nos. 3,500,118, issued Mar. 10, 1970 and 3,521,120, issued July 21, 1970 to John M. Anderson.

The disclosures of the above-referenced patents and applications are hereby incorporated by reference herein.

BACKGROUND OF THE INVENTION

This invention relates to fluorescent lamps which are adapted as direct replacements for existing incandescent lamps. More specifically, this invention concerns substantially globular fluorescent lamps wherein ionization is induced by a transformer which is positioned substantially in the center of, but external to, the lamp envelope.

The incandescent lamp is the primary luminary for household and residental lighting. This lamp generally includes an incandescent filament within a predetermined nonoxidizing atmosphere which is contained with a teardrop shaped envelope and mounted, for example, within an Edison type base which is screwed into a permanent fixture or into a movable socket.

Despite their widespread use, incandescent lamps are relatively inefficient, producing only 15–17 lumens per watt of input power and have relatively short, unpredictable service lives. Fluorescent lamps, which have efficiencies as high as 80 lumens per watt, provide an attractive alternative to incandescent lighting. Conventional fluorescent lamps, however, require a long tubular envelope which, together with the need for auxiliary ballasting equipment, has somewhat limited their acceptance in the home lighting market. Increased residential use of fluorescent illumination, with attendant savings of energy, can be achieved from the development of fluorescent lamps which are directly compatible with existing sockets and incandescent lamp fixtures.

The electric lamp technology has long sought electric discharge devices which produce visible light for general illumination purposes without the utilization of electrodes as the footpoints of a glow or arc discharge. Although the concept of electrodeless discharge lamps is very old, such lamps have always included the concept of coupling electrical energy into an hermetically sealed gas-containing envelope by means of a ferromagnetic or air core transformer to avoid the use of electrodes. Such devices have never proved practical or commercially feasible, because it has been impossible to achieve any reasonable efficiency of light emission due to the utilization of iron or air core transformers because of core losses, among other factors.

It has been proposed in the prior art to excite electrodeless gaseous discharge lamps using electromagnetic induction to transfer electric energy into the discharge vessel. Experiments along this line disclose that heretofore such means have been highly impracticable. If an air core transformer is utilized, the inefficiency of the coupling procedure required to achieve a reasonable power into the gaseous discharge results in a loss of power by radiation which is prohibitive, and which may be dangerous. Accordingly, such devices have never been successfully operated for useful periods at any reasonable efficiency.

Another alternative that has been proposed in the prior art is the utilization of an iron or ferromagnetic core. Such prior art cores, however, may be utilized only at very low frequencies in order that eddy current heating of the iron does not cause core failure. Utilizing alternating current, it is exceedingly difficult to operate an iron core transformer for the purpose of transferring energy of this nature at frequencies in excess of 5 or 10 kilohertz. Based upon experimental and calculated results obtained in this laboratory, it has been determined that for an iron core transformer operating at 50 kHz, core power losses are in the range of approximately 80 to 90 percent. Accordingly, from the foregoing it may readily be appreciated that air core and iron core transformers are, from a practical point of view, inoperative at the high radio frequency levels that are necessary for efficient operation of gaseous discharge lamps in accord with this invention.

In prior U.S. Pat. Nos. 3,500,118 and 3,521,120 there are disclosed fluorescent lamps which utilize a magnetically induced radio frequency electric field to ionize a gaseous radiating medium. The elimination of discharge electrodes within these lamp envelopes substantially increases their life and allows lamp shapes which are more compatible with home lighting needs.

U.S. Pat. No. 3,500,118, issued Mar. 10, 1970, describes an improved electrodeless fluorescent lamp having a radio frequency power supply. This lamp, while quite useful, is bulky, comprising a large tubular discharge ring, several ferrite cores, and a remotely mounted power supply which makes it unsuitable for use in many industrial and residential applications.

U.S. Pat. No. 3,521,120 issued July 21, 1970, describes a more compact lamp configuration. However, this lamp maintains a high frequency magnetic field in the air surrounding the envelope and thus constitutes a source of electromagnetic radiation and interference.

Breifly stated, concurrently filed U.S. patent applications Ser. Nos. 642,142 and 642,148 disclose electrodeless fluorescent lamps which are adapted as replacements for globular incandescent lamps. These lamps comprise a substantially globular, light-transmissive envelope which is phosphor coated and filled with an ionizable gas. A radio frequency, closed loop core, transformer lying at least partially within that envelope is used to induce a radio frequency electric field which ionizes the gas. These lamps have physical dimensions and electrical characteristics compatible with existing incandescent lighting equipment. Both of the above-mentioned lamps, however, require seals between the light transmissive envelope and either metal or magnetic core components. The bulk of the heat produced by losses within the lamps' envelope must be transmitted through these metal or core components. This heat transfer process produces differential thermal expansion between the sealing materials with resultant stresses in the seal structure. Because of these stresses, the seals represent a site for potential lamp failure and a substantial portion of the lamps' production cost.

SUMMARY OF THE INVENTION

Briefly stated, this invention concerns an electrodeless fluorescent lamp structure wherein a magnetic transformer core is contained within a reentrant cavity in a globular lamp envelope. A tubular extension of the lamp envelope traverses the cavity linking the core with an ionizable gas. The transformer core with its attendant windings and heat transfer structures is thus located external to, but centrally within, the lamp envelope. The external core position eliminates the need for seals between the envelope and metal or core components. The resultant lamp structure is compatible with existing incandescent lamps yet less prone to failure, less expensive to manufacture, and more adaptable to automated production methods than other electrodeless fluorescent lamp types.

A method for producing lamps in accordance with this invention comprises forming the reentrant cavity, for example by use of a ribbon molding machine; threading the magnetic core and winding structure onto a tubular member; fusing that member to the cavity; phosphor coating the cavity; and assembling the cavity structure to a phosphor-coated globular shell.

It is therefore an object of this invention to provide an electrodeless fluorescent lamp structure, which is compatible with existing incandescent lamp equipment, yet which does not require vacuum seals between the lamp envelope and metal or other magnetic core components.

Another object of this invention is to provide an electrodeless incandescent lamp substitute which is suitable for inexpensive, automated production.

Yet another object of this invention is to provide a method for the production of electrodeless fluorescent lamp structures.

BRIEF DESCRIPTION OF THE DRAWINGS

The novel features of this invention sought to be patented are set forth with particularity in the appended claims. The invention, together with further objects and advantages thereof, may be understood from a reading of the following specification and appended claims in view of the accompanying drawings in which:

DESCRIPTION OF THE PREFERRED EMBODIMENT

The principles of operation of electrodeless fluorescent lamps are described in U.S. Pat. Nos. 3,500,118 and 3,521,120 which are incorporated herein by reference.

Figure 1:
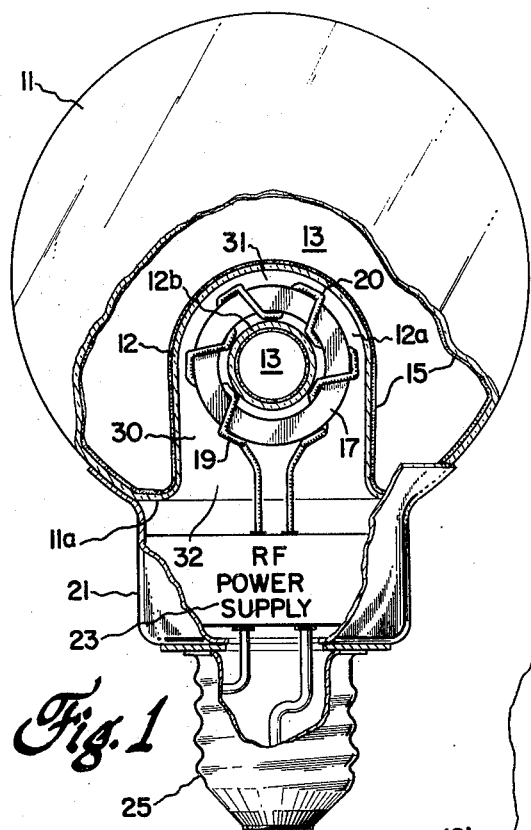
FIG. 1 is a partial sectional view of an electrodeless fluorescent lamp embodying the disclosed inventions.

FIG. 1 illustrates a preferred embodiment of this invention having a substantially globular, light transmissive envelope 11, which may for example be glass. A capsule 12 inwardly extends from a flattened base portion 11a of the envelope 11 to define a semi-obround reentrant cavity 12a, which may, for example, have a substantially rectangular cross section. A cylindrical, dielectric duct 12b traverses the capsule 12 along its axis. The structure of the capsule 12 and the duct 12b therefore define a reentrant cavity of substantially rectangular shape 32 with a superposed arc-like channel 31 of rectangular cross section. The structure of the cavity and channel are illustrated more clearly in FIG. 2 and FIG. 3.

The envelope 11 and the duct 12b contain an ionizable gas 13, for example, a mixture of rare gas (e.g., krypton and/or argon) with mercury vapor and/or cadmium vapor, of the type which emits radiation upon electrical excitation. The interior surfaces of the envelope 11 are coated with a fluorescent lamp phosphor 15, which may be any type known to the lamp art; these phosphors are capable of absorbing radiation from the gas 13 and, when excited thereby, emitting visible light.

A closed loop, magnetic core 17, advantageously of toroidal shape, lies within the capsule 12 encircling the duct 12b. To insure efficient operation, the core is preferably of a high permeability, low-loss type more fully described below. A multi-turn primary winding 19, which may, for example, be insulated with a glass fiber fabric 20, is wrapped onto the core 17 and lies within the capsule 12.

Radio frequency electric current flowing within the primary winding 19 excites a radio frequency magnetic field within the core 17. The magnetic field induces an electric field in the ionizable gas 13 within the envelope 11 and the duct 12b. The electric field ionizes the gas, stimulating radiation and visible light output. In this embodiment of the invention, the ionized gas is not relied upon to produce substantial visible light emission, but rather to produce radiation which causes light to be emitted from a fluorescent phosphor. As is well known in the art, this allows for a relatively efficient power utilization.

Obviously, the choice of magnetic core material is an important factor in enabling operation of this lamp. Whereas prior art literature has described lamp configurations having air, iron, or other ferromagnetic cores, it has been determined that the losses inherent in the operation of these, prior art cores preclude the construction of a practical, economical lamp. As indicated in the referenced patents, ferrite or similar core materials are suitable to provide high permeability and low internal heat loss at the operating frequency. As is well known to the art, a ferrite is a ceramic-like material characterized by ferrimagnetic properties and usually exhibits a spinel structure having a cubic crystal lattice and, for example, may have a generalized formula $MeFe_2O_4$ wherein Me represents a metal atom.

In accord with the present invention, it is necessary that the cores utilized be of such material and configuration that the core losses are not greater than 50 percent at the lamp operating temperature in order that effective coupling of electromagnetic energy into the light source may be effected. Similarly, low core losses reduce heating of the core and minimize the possibility of failure and maximize its efficiency. Preferably, core losses are maintained to less than 25 percent of total input power at operating temperature.

A high permeability core material is also necessary to assure adequate coupling of radio frequency energy to the gas with minimum electromagnetic radiation. Typically, a ferrite having a relative permeability of at least 2000 is preferable. Suitable ferrites are available having these characteristics over the frequency range from 25 kHz to 1 MHz. Although high frequency operation is desirable from the standpoint of minimizing core size and losses, the cost of presently available semiconductors for use in radio frequency power sources limits the maximum frequency at which a practical lamp may be operated to approximately 50 kHz. Among other materials, we have found ferrite type 8100, manufactured by the Indiana General Corporation of Keysbee, New Jersey, and characterized by operating temperature losses of less than 90 mw. cm$^{-3}$ at 1000 gauss peak flux density for 50 kHz operation to be suitable for use in this lamp. Alternately, the core may be constructed from a composite of ferrite or other powdered magnetic material in polymide or similar resin. Any such material having the loss factors indicated above and a permeability of at least 40 is suitable. The ampere-turns of the primary winding must, of course, be increased in lamps having low permeability cores, to maintain the secondary discharge voltage in a manner which is well known to the art.

The core may, if desired, be formed from several mating sections to facilitate winding and assembly of the lamp. By way of illustration only, in a typical 40 watt lamp, for example, a ferrite transformer core 17 may have a thickness of 1.6 cm., an inside diameter of 3.5 cm., and an outside diameter of 6 cm. The magnetic flux density within the core is approximately 1000 gauss.

In operation, the ionized gas forms a plasma surrounding the transformer core. The shape of this plasma may be adjusted by varying the gas pressure within the lamp over the range from approximately 0.2 to approximately 3.0 torr.[1] We have found that a gas pressure of approximately 1 torr produces a gas plasma which uniformly illuminates the lamp.

[1]Unless otherwise noted, all gas pressures described herein are measured with the lamp at room temperature.

A cylindrical base structure 21 attached to the envelope base part 11a, contains a radio frequency power supply 23 which is connected to provide a radio frequency current through the primary winding 19. A lamp base plug 25 is attached to the base structure 21 opposite the envelope 11 and is adapted to receive power line energy from conventional lamp sockets. The base plug 25 may be, as illustrated, an Edison screw base or any other plug type compatible with existing electric fixtures. The base and power supply may, if desired, be removably attached to the lamp envelope to permit individual replacement or repair of lamp components or parts.

The power supply 23 contains electronic circuits for converting power line energy supplied through the base plug 25 to radio frequency current for energizing the core 19.

These circuits may be of any type. For example, the inverter circuit which is described in referenced U.S. Pat. No. 3,521,120 would be suitable for use with lamps operating within its power range.

Figure 2:
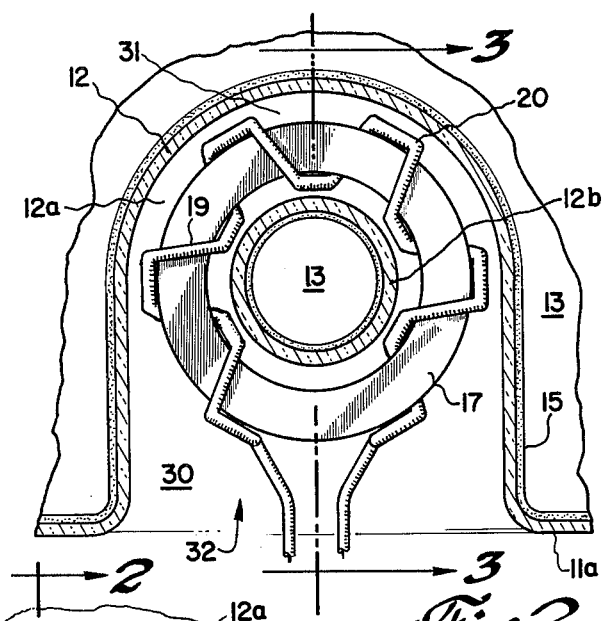
FIG. 2 is a detailed sectional view of the cavity and core structures of FIG. 1.
Figure 3:
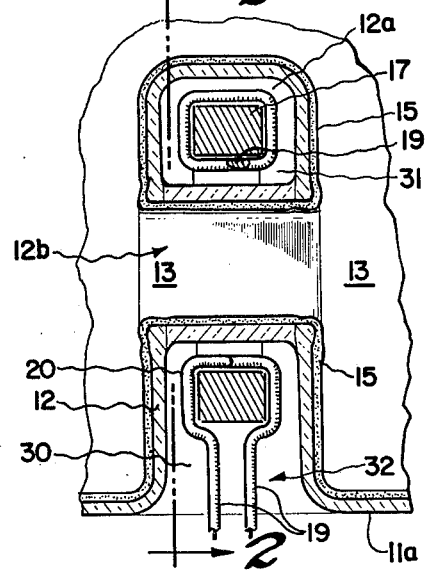
FIG. 3 is a side sectional view of the core and cavity structures of FIG. 2.

The transformer core and cavity structures are more fully detailed as sectional views in FIGS. 2 and 3 wherein the transformer core 17 may be seen to surround duct 12b which conducts the gas 13. The core 17 and winding 19 lie outside the gas 13 but are centrally located within the envelope structure. The central core location provides a plasma which fills and illuminates the envelope providing a pleasing and uniform light output. The transformer core 17 and the windings 19 lie outside the envelope, at atmospheric pressure, which facilitates heat transfer and eliminates outgassing effects with associated contamination of the gas and phosphors. Alternatively, the space 30 within the capsule 12 may be filled with a heat transfer medium or resin (not shown) to improve heat transfer from the core, if desired.

Figure 4:
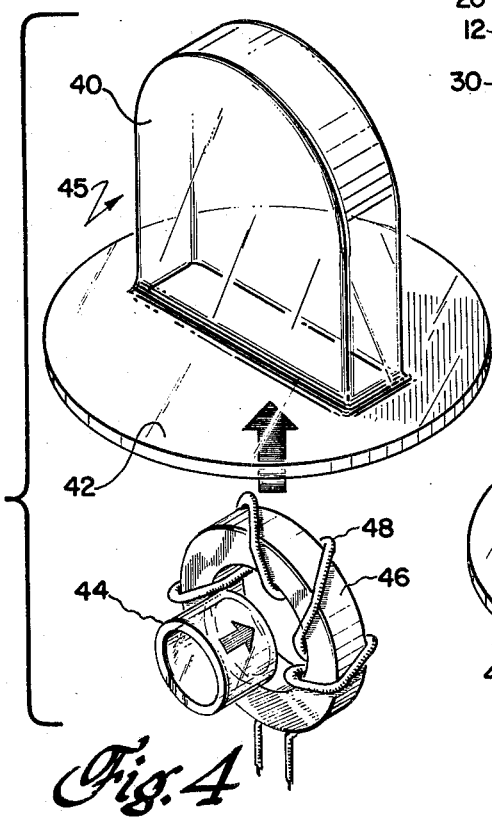
FIG. 4 details the order of assembly for a method of production of the core and cavity structures of the above-mentioned fluorescent lamp.
Figure 5:
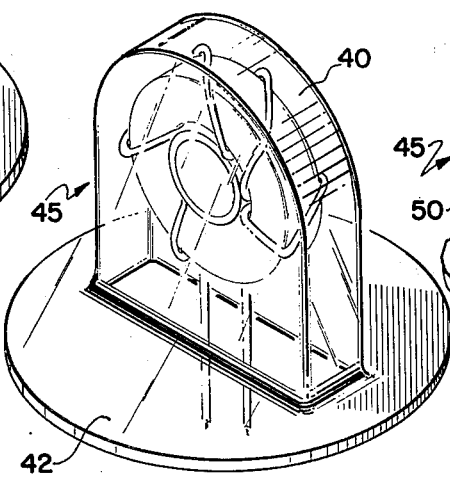
FIG. 5 shows the core and cavity structure of the fluorescent lamp prior to fusing.
Figure 6:
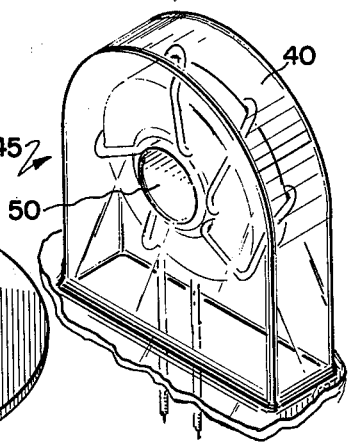
FIG. 6 shows the completed core and cavity structure after fusing of the central tube.

One method of making the reentrant cavity structure of the lamp envelope is illustrated in FIGS. 4, 5, and 6. A glass preform 45 comprising a capsule of semi-obround section 40, supported on a substantially flat, circular flare structure 42 is produced by any of the conventional glass-forming techniques (for example by molding on an automated ribbon machine). A section of glass tubing 44 with length equal to the capsule thickness is inserted through the central space of a closed loop core 46 and winding 48 structure. The core 46, winding 48, and tube section 44 are inserted into the capsule 40, as illustrated in FIG. 4, to form the structure illustrated in FIG. 5. (For the sake of clarity, the capsule is illustrated as being of rectangular cross section, but it may be cylindrical or have any other shape which is compatible with that of the core.)

Heat applied to the cavity sides in the region of the tube 44 opens apertures 50 and fuses the cavity sides to the tubing as illustrated in FIG. 6. The base structure may then be phosphor coated and fused to a phosphor coated shell in manners well known to the lamp art.

The envelope structures described above may be formed wholly from the glasses commonly used for lamp production and are suitable for automated construction using techniques and machinery common in the lamp industry. The core structure lies external to the ionizable gas providing increased heat transfer over prior art apparatus while maintaining the integrity and chemical purity of the gas and lamp phosphor which remain sealed within the envelope. The lamp design is free of glass-to-metal and glass-to-ferrite seals which consititute failure sites in other lamp configurations. The completed lamp structure has physical dimensions and electrical characteristics compatible with existing incandescent lamps and luminaires and is suitable for use as a mass-produced, direct replacement for existing incandescent lamps.

While the invention has been described in detail herein in accord with certain perferred embodiments thereof, many modifications and changes therein may be effected by those skilled in the art. Accordingly, it is intended by the appended claims to cover all such modifications and changes as fall within the true spirit and scope of the invention.

The invention claimed is:
1. A fluorescent lamp structure comprising:
an evacuable, light-transmissive, substantially globular envelope having a reentrant channel therein;
a gaseous medium within said envelope adapted to sustain an electric discharge due to an electric field induced therein, said ionizable medium emitting radiation at a first wavelength when sustaining said discharge;
means for inducing said electric field in said gaseous medium including, a closed loop magnetic core having a central opening and being at least partially contained within said channel whereby said core links said gaseous medium; and a luminescent phosphor dispossed on the interior of said envelope and adapted to emit visible light when excited by said first wavelength radiation.

2. The lamp of claim 1 wherein said core comprises ferrite.

3. The lamp of claim 1 wherein said core has a loss factor of not more than 50 percent at the operating frequency and temperature of said lamp.

4. The lamp of claim 3 wherein said core has a permeability of at least 40 and said loss factor is not more than 25 percent.

5. The lamp of claim 1 wherein said channel has a substantially rectangular cross section.

6. The lamp structure of claim 1 wherein said channel is formed by the intersection of a reentrant glass capsule extending from said envelope with a dielectric central duct.

7. The lamp structure of claim 6 wherein said capsule is semi-obround and said central duct is a cylinder aligned substantially coaxial to said capsule.

8. The lamp structure of claim 1 wherein said envelope is glass.

9. The lamp structure of claim 1 wherein said gaseous medium comprises a mixture of rare gas and a gas selected from the group consisting of mercury vapor, cadmium vapor, and mixtures thereof.

10. The lamp structure of claim 9 wherein said rare gas comprises gases selected from the group consisting of krypton, argon, and mixtures thereof.

11. The lamp structure of claim 9 wherein said gaseous medium has a pressure of between approximately 0.2 torr and approximately 3.0 torr.

12. The lamp structure of claim 1 wherein said means for inducing said field comprises a winding on said core and means for energizing said winding with a radio frequency electric current.

13. The lamp structure of claim 12 wherein said winding is insulated with a glass fiber fabric.

14. The lamp structure of claim 12 wherein said means for energizing said winding comprises an electronic power supply, adapted to receive input energy at power line voltage and frequency and to convert said input energy to an output radio frequency voltage across the ends of said winding.

15. The lamp structure of claim 14 wherein said power supply is contained within a hollow, substantially cylindrical base member having first and second ends, said first end being attached to said envelope.

16. The lamp structure of claim 15 further comprising connecting means attached to said second end of said base member and adapted to supply said input energy to said electronic power supply.

17. The lamp of claim 16 wherein said connecting means comprises a lamp base plug adapted to receive said input energy from power line sockets.

18. The lamp of claim 1 wherein said electric field has a frequency between approximately 25 kHz and approximately 1 MHz.

19. The lamp of claim 18 wherein the electric field has a frequency of approximately 50 kHz.

20. The lamp structure of claim 1 wherein said channel is formed by the intersection of a reentrant cavity of substantially rectangular cross section with a dielectric central duct.

21. A fluorescent lamp base structure comprising:
    a substantially rectangular member defining a cavity having approximately square front and back surfaces, said front and back surfaces each having a centrally-located perforation, the bottom surface of said cavity having a substantially rectangular perforation adapted to allow access to the interior of said cavity;
    a tubular dielectric member, having sectional dimensions approximately equal to the dimensions of said perforations, extending between said front surface and said back surface and sealed thereto at the edges of said perforations; and
    a closed loop magnetic core disposed on said tubular member and contained within said cavity.

22. The base structure of claim 21 wherein said core is annular and said tubular member passes through a central opening of said core.

23. The base structure of claim 21 wherein said bottom surface of said cavity is outwardly extended to define a flare, whereby said cavity is attached to a lamp envelope.

24. The base structure of claim 23 further comprising a conductive winding on said core.

25. The base structure of claim 23 wherein said tubular member and said rectangular member are glass.

26. The base structure of claim 21 further comprising a phosphor coating disposed on the surfaces of said rectangular member.

27. A method of making a fluorescent lamp comprising:
    preforming a glass capsule having a perforated bottom portion with a flare extending therefrom;
    wrapping at least one conductive winding on a closed loop magnetic core;
    inserting a tubular glass member through a central opening in said magnetic ore, the length of said tubular member being approximately equal to the width of said capsule;
    aligning said tubular glass member and core within said capsule so that said tubular member is parallel to the width dimension of said capsule;
    perforating said capsule at the ends of said tubular member; and
    fusing the walls of said capsule to the ends of said tubular member.

28. The process of claim 27 wherein said capsule is semi-obround and said tubular member is of circular cross section aligned to lie coaxial with said capsule.

29. The process of claim 27 further comprising the operation of fusing said flare to a substantially globular glass envelope whereby said capsule forms a reentrant cavity within said envelope.

* * * * *